United States Patent [19]

Walker et al.

[11] 4,048,267

[45] Sept. 13, 1977

[54] AERATION SYSTEM WITH FOLDABLE LOW-LOSS DOWNCOMERS AND METHOD OF OPERATION THEREOF

[75] Inventors: James Donald Walker; Leslie F. Kline, both of Aurora, Ill.

[73] Assignee: Chicago Bridge & Iron Company, Chicago, Ill.

[21] Appl. No.: 453,260

[22] Filed: Mar. 21, 1974

Related U.S. Application Data

[63] Continuation of Ser. No. 217,523, Jan. 13, 1972, abandoned.

[51] Int. Cl.² .............................................. B01F 3/04
[52] U.S. Cl. ........................... 261/122; 261/DIG. 47;
285/24; 285/282; 285/283; 285/326
[58] Field of Search ........................ 261/DIG. 47, 122;
285/282, 283, 325, 326, 327, 24

[56] References Cited

U.S. PATENT DOCUMENTS

| | | | |
|---|---|---|---|
| 2,000,087 | 5/1935 | Meeker et al. | 285/283 |
| 2,328,655 | 9/1943 | Lannert | 261/DIG. 47 |
| 2,521,454 | 9/1950 | Dressler | 261/DIG. 47 |
| 2,527,097 | 10/1950 | Katow | 261/DIG. 47 |
| 3,063,741 | 11/1962 | Bockerman | 285/283 |
| 3,116,021 | 12/1963 | Born | 261/DIG. 47 |
| 3,339,901 | 9/1967 | Walker | 261/DIG. 47 |
| 3,352,573 | 11/1967 | Canning | 285/238 |
| 3,622,132 | 11/1971 | Rawlings, Jr. | 261/DIG. 47 |
| 3,685,858 | 8/1972 | Wandler | 285/27 |

FOREIGN PATENT DOCUMENTS

| | | | |
|---|---|---|---|
| 18,871 | 12/1907 | United Kingdom | 261/DIG. 47 |

*Primary Examiner*—Tim R. Miles
*Attorney, Agent, or Firm*—Darbo, Robertson & Vandenburgh

[57] ABSTRACT

The downcomer through which air is supplied to a header for liberation of air deep in an aeration tank is of straight-line nature to minimize constant waste of power due to air flow friction. The downcomer nevertheless folds when the header is to be raised for inspection or servicing. The folding axis is external of the downcomer, which breaks open as the folding action starts. In one form the header is straight while initially raised, hanging from a first hoist cable, and then as the lower section is raised further by a second cable the upper section is allowed to fold over. In another form, the folding progresses as the structure is raised, the upper section being hinged to the air supply fitting.

8 Claims, 10 Drawing Figures

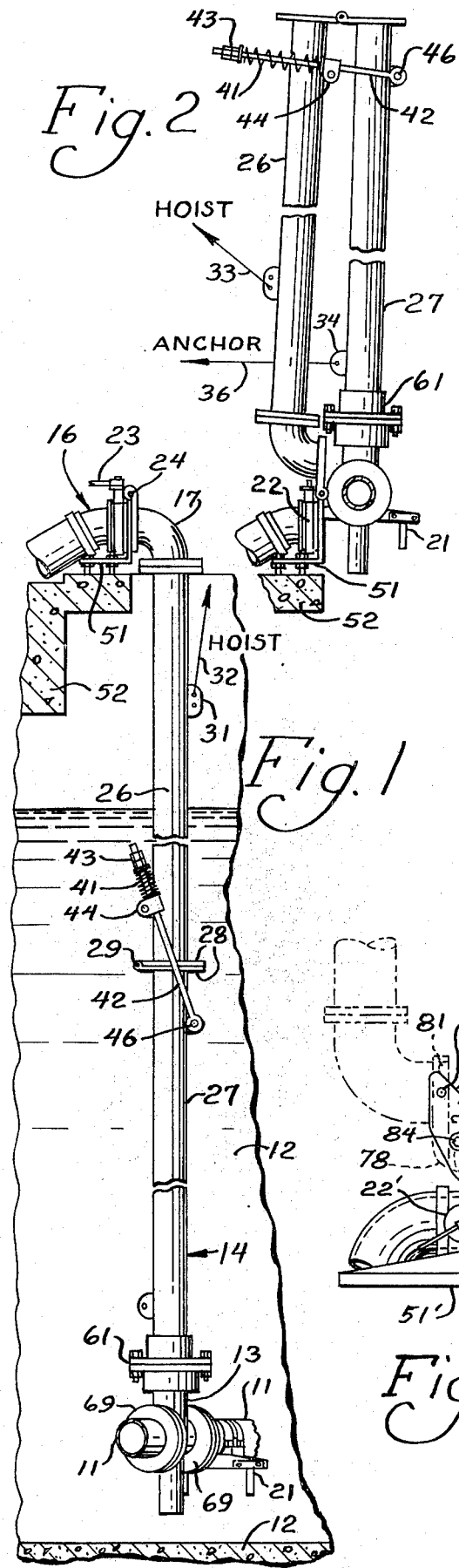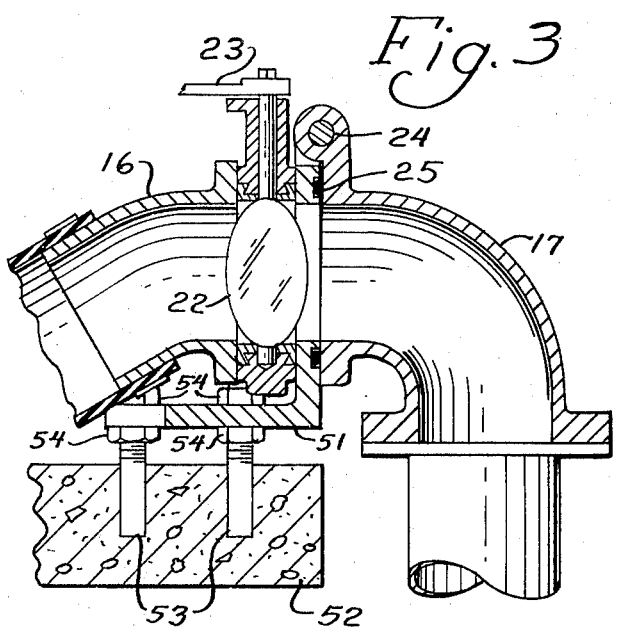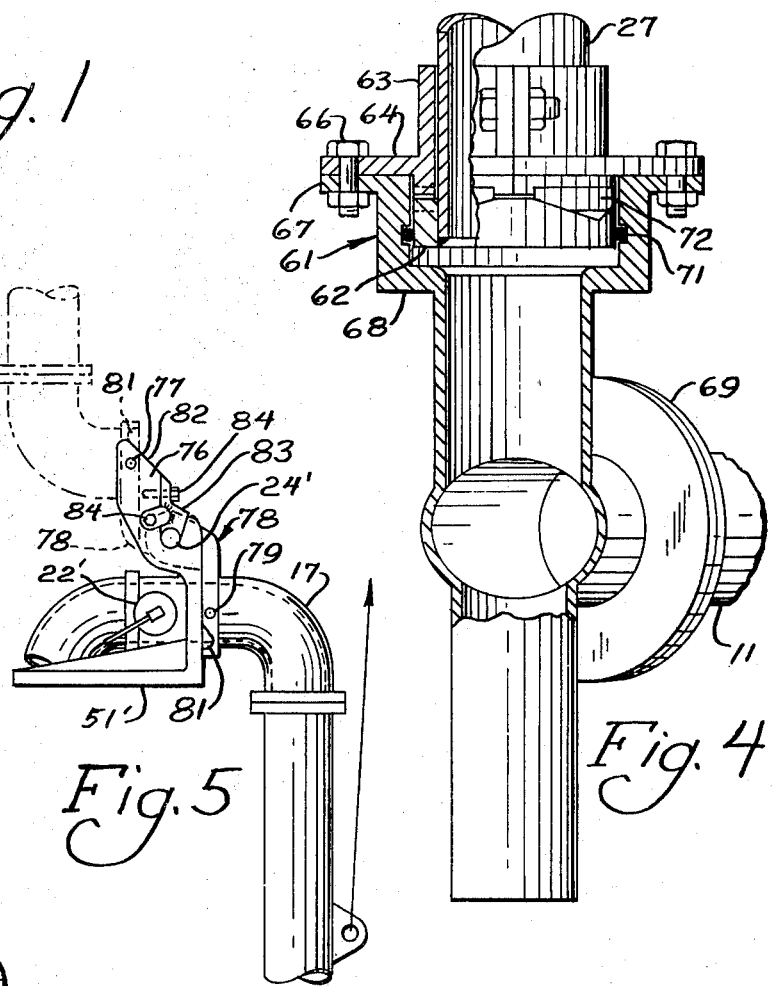

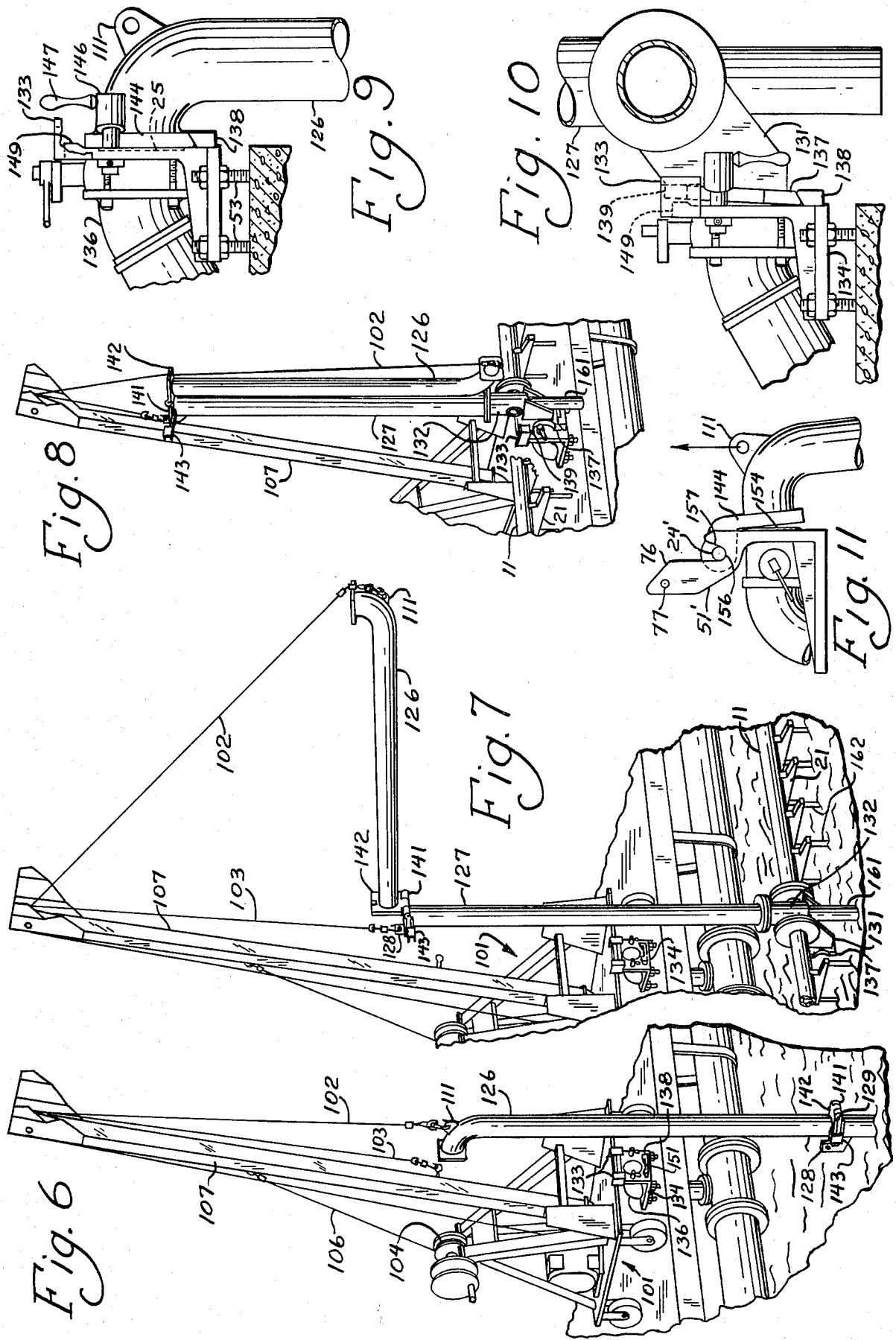

AERATION SYSTEM WITH FOLDABLE LOW-LOSS DOWNCOMERS AND METHOD OF OPERATION THEREOF

This is a continuation of application Ser. No. 217,523 filed Jan. 13, 1972, being abandoned upon filing of this application.

INTRODUCTION

The invention of which the present disclosure is offered for public dissemination in the event that adequate patent protection is available relates to aeration equipment such as is used in sewage treatment. More particularly it relates to structures in which a header for liberating air at numerous points is supplied with air by a downcomer which can be raised (by a straight lift or a swinging action) for raising the header for inspection.

Heretofore there have been various types of header-lifting downcomers. The standard for many years was one that was sometimes referred to as a "knee action" diffuser in which the downcomer included an upper section pivoted by an air-swivel connection to the air supply fitting and a lower section similarly pivoted to the upper section. By attaching a hoist to the upper section it could be swung about its upper pivot for raising the lower section and lifting its header to a position of access. The two air-swivel pivotal joints were of the offset type, each having an elbow. Each elbow adds its own resistance to the flow of air through the pipe, necessitating a slightly higher pressure at the pump for producing the required pressure at the point of air liberation. This increased pressure requirement constituted a constant waste of power, as compared to using a downcomber with fewer elbows. Because of the tremendous quantities of air which are continuously pumped in sewage treatment, such loss of power represents a substantial extra cost in the course of a year.

Straight downcomers which are low-loss downcomers in that they do not have this power loss have been used either as fixed downcomers or as downcomers which can be removed easily from the air supply fitting and raised as one rigid structure. U.S. Pat. No. 3,339,901, issued to the present owner under assignment from one of the present inventors, represents this type of construction. Although a considerable quantity of equipment has been sold for use under this patent, some potential users have been fearful of accidents with a heavy pipe (for example, 4 inches in diameter) extending 15 feet or so into the air. Use of this type of construction has been far from universal.

More recently other low-loss downcomers have been available in which the power loss from elbows has been reduced by replacing the swivel joints with lengths of flexible hose. However, it has not been deemed practicable to rely on the hoses alone for structural strength, and complicated physical linkages have also been provided, increasing the complexity and cost.

According to the present invention, another form of low-loss downcomers is provided, in which no hoses are used and no elbows are used except the inevitable top elbow directing the air downwardly from the air supply fitting. The knee action straight-line piping, without elbows, is made possible in part by recognition that there is no need for continuity of the conduit except when the header is in its position of use, and that therefore the knee action or folding can be of a simplified type which permits the knee joint to break open as it bends, the hinge axis being outside of the straight conduit line. In one form of the invention, a similar joint at the hip position connecting the upper section of the downcomer to the air supply fitting likewise provides hinging at that point with only the single inevitable elbow for directing the air flow downwardly. Another form of the invention more nearly resembles U.S. Pat. No. 3,339,901, but after the second cable thereof is attached to the lower section, the upper section folds over as the lower section is raised. Thus, the high upstanding heavy pipe, and the supposed danger thereof, are avoided.

For either form a movable hoist is placed in position, but with either form the hoist may be disconnected and moved away after the header has been raised and "parked", or secured in its raised position. The folding of the downcomber contributes to the practicability of parking the header in a position of access without retention of the hoist mechanism at the site.

Additional objects and advantages of the invention will be apparent from the following description and from the drawings.

DESIGNATION OF FIGURES

FIGS. 1 and 2 are side elevations of the double-hinge form of the invention, FIG. 1 showing the header position near the bottom of the tank and FIG. 2 showing the header raised.

FIG. 3 is an enlarged vertical sectional view through the upper hinge area.

FIG. 4 is a vertical view partly broken away to show a vertical section of one side of the swivel which permits changing the angularity of the header.

FIG. 5 is a fragmentary side view of a preferred form of the structure in the upper hinge area.

FIGS. 6, 7 and 8 are views of perspective nature showing the single hinge form of the invention, FIG. 6 showing the straight downcomer hanging from the first cable as it is being raised, FIG. 7 showing the second cable attached to the lower section for raising it further while the upper section is permitted to double over, and FIG. 8 showing the completely raised structure.

FIG. 9 is a side view of the structure in the area of the connection to the air supply fitting and FIG. 10 is a view similar to FIG. 9 but showing the header in its parked position.

FIG. 11 is a view of preferred details for a general form of the invention of FIGS. 6 to 10 showing the slightly unseated condition as the structure hangs from an off-center cable.

INTENT CLAUSE

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

BACKGROUND DESCRIPTION

The invention is concerned with the problem of supplying air to a header 11 deep in an aeration tank 12 of a sewage treatment plant. The header is usually a double header extending in opposite directions from a "T"

13 at the bottom of a downcomer 14 which is supplied with air from an air supply fitting 16 through an elbow 17 which directs the air downwardly and supports the downcomer 14 and header 11. As seen best in FIG. 7, the header is provided with a plurality of air liberation devices 21 along its length. The devices 21 are diagrammatic representations of a commercially known double sparger more accurately shown in U.S. Pat. No. 3,501,133. The air supply fitting 16 is conventionally supplied with a butterfly valve operated by a handle 23 which may be used both for regulating the supply of air and for substantially shutting off the supply of air when the header is to be raised for servicing or inspection.

THE TWO-HINGE FORM OF THE INVENTION

In FIGS. 1 to 3 the upper elbow 17 is hinged to the air supply fitting 16 by a hinge pin 24. In the FIG. 1 position, a gasket 25 seals the hinge plates to one another. The upper section 26 of downcomer 14 is rigidly secured to elbow 17 by a conventional flange connection. All such ordinary flanged connections may be assumed to have the usual bolts and gasket, though illustration of these details is not necessary.

The lower section 27 of downcomer 14 is hinged to upper section 26. More specifically, the flanges 28, one on each section, are hinged together by a hinge pin 29.

A hoisting lug 31 is welded to the upper section 26 slightly above the water level. Using a type of hoist conventional with prior knee action diffusion equipment, a hoist line can be connected, as by a snap or lock-on shackle, through an eye of lug 31 and drawn initially approximately in a direction indicated by arrow 32 to swing upper section 26 and about the hinge pin 24. This raises header 11 which with its lower section 27 of downcomer 14 continues to hang downwardly from upper section 26. Eventually the structure reaches the position shown in FIG. 2, the hoist by this time having changed its direction of pull to be acting more nearly along the line 33. If the hoist is to be removed, an anchor line may be secured to anchoring lug 34 welded to lower section 27, and this anchoring line may extend in a direction such as indicated by arrow 36 to a suitable fixed anchor point. Once the anchor line is thus secured, the cable from the hoist mechanism may be removed and the hoist mechanism may be taken elsewhere.

As observed from FIG. 1, the downcomer 14, when in use, is a straight-line downcomer, with no added resistance due to elbows. The elbow 17 may be regarded as an inevitable elbow for directing the air downwardly, and not part of a downcomer even though rigidly connected to it.

Both of the hinge pins 24 and 29 extend along axes outside of the line of air flow, lying in a plane perpendicular to the direction of adjacent air flow. It follows that the pivotal action about these hinge pins results in opening the conduit. However, such breaking open of the conduit is entirely harmless because butterfly valve 22 will have been closed prior to this action.

In connection with a device of this type, there is a problem concerning the sealing of flanges 28 to one another, inasmuch as they are far below the liquid level when the flanges 28 swing into engagement with one another, or nearly so. Of course, one of these flanges 28 will carry a gasket such as an O-ring and so there is no problem of sealing except the problem of closing the hinge to the position seen in FIG. 1. With the structure illustrated, the offset position of hinge pin 29 would cause the lower section 27 to hang downwardly so that its center of gravity would be directly below the hinge pin 29.

According to one feature of the present invention, hinge-closing springs 41 (one on each side of downcomer 14) are provided for drawing the flanges 28 into proper engagement. This incidentally holds the lower section 27 in its vertical position so that the header 11 will be properly positioned. Each spring 41 surrounds a toggle rod 42 and (FIG. 1) is compressed between a knob 43 (such as a pair of nuts) on the end of rod 42 and a spring seat 44 hingedly mounted on the upper section 26. The rod 42 is shown offset from the pivotal axis of seat 44, but it could intersect that axis for less friction. Rod 42 extends through the hinge seat 44 to a pivotal connection at 46 with the lower section 27. Because the spring is in compressed state, it urges knob 43 and rod 42 upwardly thereby raising pipe 27 and its flange 28 to close the flanges 28 upon one another.

As upper section 26 is swung outwardly about its hinge pin 24, spring 41 holds the flanges 28 in closed engagement until lower section 27 moves to such an angle that its weight is able to compress spring 41 further. Only a little further compression of spring 41 is required, however, before rod 42 passes through a dead center position, as it crosses the axis of hinge pin 29. At this point, spring 41 starts to urge lower section 27 in the opposite direction further opening the flanges 28, although this action is immaterial. Further swinging of upper section 26 upwardly brings pivotal axis 46 closer and closer to the pivoted seat 44 so that the spring 41 can expand to its relaxed state, after which it exerts no influence. Thus as seen in FIG. 2, the spring 41, though expanded relative to its condition in FIG. 1, is not as long as the space between knob 43 and spring base 44.

Air supply fitting 16 is carried by, or a part of, base casting 51, which is mounted on tank structure such as bridge 52. The hinge pin 24 is thus carried by base casting 51. The mounting of base casting 51 is preferably by means of studs 53, as seen best in FIG. 3; two on each side of the air supply fitting 16. Each stud 53 is provided with nuts 54, above and below the bottom plate of base casting 51. By adjusting the nuts 54, the header 11 can be leveled. It is desirable for header 11 to be level so that the air flow at different points along its length will meet the same hydraulic head pressure, so that (through orifices of the same size) the air flow will be equal.

The preferred positioning of the headers 11 is at a bias as seen in FIG. 1. Bridges 52 usually extend perpendicularly across the tank. Accordingly, the bias positioning of header 11, which is desirable when the header is in use, may be undesirable when the header has been raised to the level shown in FIG. 2. The bias positioning of a long header at this level would tend to put one part of the header in a position blocking passage along the bridge while the opposite end of the header would be out of reach from the bridge. Accordingly, it is preferred to provide a swivel connection 61 so that the header can be swung angularly to be parallel with bridge 52 when raised, as indicated in FIG. 2, and to be at the bias position when at the bottom of the tank as indicated in FIG. 1. One form of suitable swivel 61 is illustrated in FIG. 4. The lower section 27 of downcomer 14 has a narrow flange 62 welded around its lower end. This flange swively supports header 11 through split collr 63, its flange 64, bolt 66, flange 67 and casting 68, of which flange 67 is a part. Casting 68 is a "T", having flanges 69 to which the two parts of the double header are bolted.

An O-ring seal 71 in a suitable groove in casting 68 seals against flange 62 preventing the escape of air through the swivel joint. Accordingly, the sleeve portion of collar 63 may have a smooth pivoting fit with section 27. Preferably the sleeve 63 is long enough to ensure perpendicularity of the header 11 to the length of section 27.

Preferably some means is provided for holding the headers 11 at the desired bias angle when at the bottom of the tank. This may be by yieldable detent action. For example, lugs 72 may be provided which are locked to one of the members 62, 63 while having a V-type of camming engagement with the other. In the bias position of FIG. 1, the lugs 72 would provide a locking or positioning action due to the V shape. When the header has been raised, and as it swings in toward the bridge 52, a moderate force exerted at the far end of one of the header portions 11 will swing the header, causing the two V's to ride out from one another with some lifting of the header as a result. As the lowering action starts after the header has been serviced or found not to need servicing, a small force exerted at the far end of one of the header portions, in the opposite direction from that used before, will turn the header approximately to its bias position and gravity will seat one V in the other, thereby ensuring the proper angularity of header 11 to provide the desired bias positioning.

FIG. 5 discloses some details which are now preferred over the details of FIGS. 1 to 3. The hinge pin 24' is located substantially to the rear of the plane of the O-ring 25 so as to be further from the vertical plane through the center of gravity of the hinged diffuser structure. This provides more sealing pressure on the O-ring. A clamp can be provided, as seen in FIG. 9, if found necessary.

Whether or not the hinge pins 24' are moved to the rear of the plane of O-ring 25, it is desirable to provide means for limiting the upward swinging movement of the hinged structure, and for locking it in place. For this purpose, base casting 51' is provided with upwardly and rearwardly extending wings 76, one of which is provided with a hole 77 through it. The swinging hinge structure 78, which is part of the casting of elbow 17, is provided with a matching hole 79 which will align with the hole 77 when the swinging structure approaches the point of equilibrium. A pin can be inserted through hole 77 into the hole or recess 79, to lock the pivotal parts in position. Movement of the hinged parts can be limited by a lug 81 formed as part of the casting 78, and striking the surface 82 of one of the wings 76. The stopping action can be made to occur before equilibrium is reached, or just afterwards.

With this form of the invention the butterfly valve 22 turns about a horizontal axis, so that its handle will be more readily accessible. Of course, in FIGS. 1 to 3 the butterfly valve could also have a horizontal axis.

The hinge pin 24' may conveniently be two studs integrally cast with casting 78 and extending in opposite directions therefrom. In this event, base casting 51' may be provided with a filler 83 secured by screws 84. This permits installation by removing the filler, and lowering the entire swing diffusion unit into place, the lugs 24' entering the notches left by the filler 83. The filler 83 is then secured in place by the screws 84 to withstand the reaction resulting when the hoist line is applied as indicated by arrow 32.

The same casting 51' may also be used with the form of the invention about to be described, the filler 83 in this instance not being used.

SINGLE HINGE FORM OF INVENTION

The form of the invention shown in FIGS. 6 to 11 is a form having a single hinge. The upper hinge represented by the hinge pin 24 of FIG. 1 is omitted.

This form of the invention uses a hoist 101 such as that described in U.S. Pat. No. 3,339,901, which has two cables 102 and 103 each with its own winch. These winches, not shown, are separately controlled and are preferably powered winches. In addition there may be a third winch 104 controlling a boom line 106 for changing the angularity of boom 107.

As taught in the patent mentioned, the first cable 102 is initially snapped to the hoist lug 111 near the top of upper section 126 of the downcomer. Starting from the service position in FIG. 9, the initial lifting is as seen in FIG. 6. Cable 102 continues to lift the diffuser assembly until a lower lifting lug 128 becomes readily accessible. At that time, the second cable 103 is snapped into lifting lug 128. The lifting is then by cable 103, as shown in FIG. 2. Because cable 102 is not reeled in further, and may be allowed to unreel somewhat, the upper section 126 pivots outwardly with respect to the lower section 127, swinging about the hinge pin 129.

Cable 103 is raised until a parking bracket 131, which may form part of the bottom T-casting 132, is high enough to slip into the parking guides 133 forming part of the base casting 134 associated with the air supply fitting 136.

Next the winch 104 is operated to draw in the cable 106 slightly to change the angle of boom 107 enough to let the parking plate 137 swing into position approximately as shown in FIG. 10, but slightly higher. Then cable 103 is payed out slightly to let the parking plate 137 settle down to the position shown in FIG. 10. Here it is seen that the inclined lower surface of plate 137 rests in a secured position on the sloping upper surface of cam bar 138. At the same time wings or lugs 139 extending laterally from plate 137 are retained within guides 133, so that the entire raised diffuser structure is now firmly secured independently of the cables 102 and 103 and they may be disconnected. The hoist 101 may now be moved away to raise another diffuser assembly.

For restoring the diffuser assembly to its useful position, the operation is reversed. If the hoist has been removed, it is returned, and locked in place for stability by means not shown. Cable 103 is secured to lifting lug 128, and cable 102 is (now or a little later) secured to lifting lug 111. Cable 103 is raised to unseat parking plate 137 from beveled bar or cam bar 138 and to raise lugs 139 above guides 133. Now cable 106 can be payed out slightly so that the parts hanging from cable 103 will swing out to have clearance with guides 133 and the associated parts as the diffuser assembly is lowered. Cable 103 is now payed out, and as it lowers lower section 127, cable 102, without being drawn in, starts the swinging of upper section 126. Before lift lug 128 is lowered far enough to become inaccessible, upper section 126 will be drawn into alignment with lower section 127, closing hinge plates 141 and 142 together. Preferably at this stage, the hinge plates 141 and 142 are locked together by any suitable clamping means, diagrammatically represented by a swinging "C" clamp 143. They are sealed to one another by virtue of an O-ring between them. With the weight of the entire diffuser assembly hanging from cable 102 and slack in cable 103, cable 103 is released from lift lug 128.

Cable 102 is now payed out to lower the diffuser assembly to its operative position, the boom 107 being shifted rearwardly if necessary to achieve this. Thus when the face plate or rest member 144 is slightly higher than is shown in FIG. 9, it is moved inwardly to lie above bevel bar 138 and then lowered to rest on this bar. The contact is at widely separated parts of bar 138 to ensure accurate positioning of the header deep in the tank. Plate 144 slides between a pair of sealing cams 146 which can be turned by handles 147 to press the plate 144 firmly against an O-ring seal held by air supply fitting 136.

So that the O-ring seal on fitting 136 will not be damaged by the sliding of plate 144 thereon, a lug 149 may be provided which holds plate 144 spaced from the O-ring seal until it is appoximately at the final level.

Plate 144 is preferably narrow enough at the regions near the level of guides 133 so as not to engage these guides. Parking plate 137 is preferably narrow enough in the region of the level of cams 146 so as not to engage these cams. Parking plate 137 can also pass quite freely between lug 149 and the retaining flanges of guide 133. This can be accomplished either by the dimensions of guides 133 or by special shaping of parking plate 137 in the vicinity of lug 149.

Bevel bar 138 preferably is recessed along its central portion as seen at 151 in FIG. 6, so that seal plate 144 will be supported only near the side edges thereof. Thus plate 144 is a rest member resting on two widely separated parts of bevel bar 138. This provides adequate leveling of the header 11, once the nuts have been properly adjusted on the studs 53.

FIG. 11 shows variations which are now preferred when the single-hinge form of the invention is to be used. Here the base 51' is the same as in FIG. 5. The wings 76 will be somewhat shortened, so as not to provide locking hole 77 unless the manufacturer is likely to be furnishing the two-hinge form as well as the one-hinge form. In that event the same base casting 51' can be used for both forms.

FIG. 11 shows the swing diffuser assembly when it has been raised just enough to unseat the lugs 24'. The lift lug 111 is positioned far enough to the right so that gravity swings the diffuser assembly to a tilted position somewhat as shown, relieving contact from the O-ring 154. When the cable engaging lift lug 111 is slowly payed out, the lugs 24' settle to the bottom of grooves 156, and thereafter further lowering of lift lug 111 permits the swing diffuser to swing to its normal position with seal plate 144 pressing firmly agnast O-ring 154. With the lugs 24' as far to the left as shown, and if accurate positioning of cam surface 157 proves practicable, it may not be necessary to use any clamps such as the clamps 146. Such clamps should be provided, though not illustrated in FIG. 11, until found unnecessary.

ACHIEVEMENT

It is apparent from the foregoing that straight-line downcomers are provided so that the power losses due to air flow friction are at a minimum, the header thus being a low-loss header. Nevertheless the downcomber can be folded. In one form of the invention the folding accompanies the raising of the diffuser assembly by swinging the upper section of the downcomer about an upper hinge. In another form of the invention, the folding occurs after a second cable has been attached at the top of the lower section after first raising the entire assembly, as one rigid unit, until the lower section is accessible. With both forms of the invention, the folding of the downcomer contributes toward the ability to remove the hoist, with safety, while the header is parked in a position of access for servicing or inspection.

Both forms lend themselves to the preferred bias positioning of the headers. In the two-hinge form, a swivel is provided so that the header may be swung from its bias angle to an angle paralleling the bridge or walkway from which it is to be serviced. In the one-hinge form, no such swivel is required because the entire assembly can be swung while it hangs from a cable, so as to swing the header from its bias position to the parallel angle just mentioned.

Both forms of the invention are characterized by simplicity and rugged dependability. The folding of the downcomer is accomplished without the use of flexible hoses and the corresponding necessity for structural linkage which relieves the hose from load-carrying functions.

With a clog-resistant system such as that of U.S. Pat. No. 3,501,133, the breaking open of the downcomer is not objectionable. Sludge which enters at this joint (or through blowdown pipes 161 and 162 during lowering) is mostly displaced through the blowdown pipes 161 and 162; and the orifices at a higher level are large enough not to clog easily.

It will be apparent from the drawings that the downcomer has substantially the same low head loss characteristics (low resistance to air flow) as a one-piece pipe. Of course, this is not intended to exclude having a slight bend to offset the header laterally from the vertical line of the downcomer. It is an offset such as this which is most likely to require clamps such as clamp 146 of FIG. 9.

The term "lift formation" is not intended to require an added piece such as lugs 31 and 111. For example, the flanges could be similarly used if the hoist cables were provided with cradles nesting or seizing them.

We claim:

1. Air diffuser apparatus include a low-loss downcomer for delivering air to a header carried at its foot for deep submergence in an aeration tank; the downcomer being foldable at an intermediate level by virtue of hinge means rigidly associated with upper and lower sections of the downcomer and hinged together about an axis which passes in substantially nonintersecting relationship to the air flow space within the downcomer, the hinged parts, with their upper and lower sections, being substantially sealed to one another when the hinge means is closed and breaking open to the surrounding medium as the downcomer folds;

the diffuser apparatus being readily separable from an air supply fitting normally communicating with it, and each section of the downcomer having a lift formation near its top whereby the diffuser apparatus may be raised initially as a rigid unit by hoist means attached at the top of the upper section, where accessible during aeration, and lifted further with a folding action by hoist means attached at the top of the lower section.

2. Air diffuser apparatus including a low-loss downcomer for delivering air to a header carried at its foot for deep submergence in an aeration tank; the downcomer being foldable at an intermediate level by virtue of hinge means rigidly associated with upper and lower sections of the downcomer and hinged together about an axis which passes in substantially nonintersecting relationship to the air flow space within the downcomer, the hinged parts, with their upper and lower sections, being substantially sealed to one another when the hinge means is closed and breaking open to the surrounding medium as the downcomer folds;

the diffuser apparatus being separable from an air supply fitting normally communicating with it, and each section of the downcomer having a lift formation near its top whereby the diffuser apparatus may be raised initially as a rigid unit by hoist means attached at the top of the upper section, where accessible during aeration, and lifted further with a folding action by hoist means attached at the top of the lower section;

a parking bracket associated with the header, and holding means for the parking bracket above the water level whereby the hoist means may place the parking bracket of the folded aeration equipment in the holding means and be taken away for other use, leaving the header accessible for servicing.

3. Air diffuser apparatus including a low-loss downcomer for delivering air to a header carried at its foot for deep submergence in an aeration tank; the downcomer being foldable at an intermediate level by virtue of hinge means rigidly associated with upper and lower sections of the downcomer and hinged together about an axis which passes in substantially nonintersecting relationship to the air flow space within the downcomer, the hinged parts, with their upper and lower sections, being substantially sealed to one another when the hinge means is closed and breaking open to the surrounding medium as the downcomer folds;

the diffuser apparatus being separable from an air supply fitting normally communicating with it, and each section of the downcomer having a lift formation near its top whereby the diffuser apparatus may be raised initially as a rigid unit by hoist means attached at the top of the upper section, where accessible during aeration, and lifted further with a folding action by hoist means attached at the top of the lower section;

a parking bracket associated with the header, and holding means for the parking bracket above the water level whereby the hoist means may place the parking bracket of the folded aeration equipment in the holding means and be taken away for other use, leaving the header accessible for servicing;

at least part of said holding means also serving to hold the diffuser equipment in service position but readily separable.

4. The method of servicing an air diffusion apparatus including a downcomer which is straight along its midsection and a header having primary orifices and larger and lower secondary orifice means, which comprises attaching a first hoist line near its top and raising the diffusion apparatus initially as a rigid unit; then attaching a second hoist line at its mid-zone and raising the lower portion of the apparatus further by that line while folding its upper section outwardly and relatively downwardly by the raising of the lower portion while the upper section is under control by the first line and while breaking open the downcomer by hinging about an axis external of the downcomer, servicing its header in an accessible location while raised, restoring the apparatus to its service position while letting sludge enter it, and blowing out its sludge contents mainly through the secondary orifice means.

5. Air diffuser apparatus including a low-loss downcomer for delivering air from a supply fitting to a header carried at its foot for deep submergence in an aeration tank, the downcomer being foldable at an intermediate level by virtue of hinge means rigidly associated with upper and lower sections of the downcomer and hinged together about an axis which passes in substantially nonintersecting relationship to the air flow space within the downcomer, the hinged parts, with their upper and lower sections, being substantially sealed to one another when the hinge means is closed and breaking open to the surrounding medium as the downcomer folds and the downcomer being readily manipulatable to bring the header to adjacency with the supply fitting;

spring means effective when the hinge mean is closed for holding it closed firmly to maintain a seal and proper alignment of the sections.

6. Air diffusion apparatus according to claim 5 in which said spring means resists the folding action only during the initial portion of the folding action.

7. Air diffuser apparatus including a downcomer for delivering air to a header carried at its foot for deep submergence in an aeration tank, a supply fitting support structure associated with the supply fitting for normally supporting the downcomer in communication with the supply fitting, the downcomer being separable from the supply fitting for raising the header to an accessible position, characterized by:

the downcomer having associated with its upper edge a rest member normally resting on widely separated parts of the support structure so that its position as to levelness is accurately determined and normally having a rigid and predetermined angular relationship with the header as to levelness, to hold it level when the rest member is at rest on said widely separated parts.

8. Air diffuser apparatus according to claim 4 in which adjustable means is provided for making an installation adjustment of the header to levelness while the rest member is thus at rest.

* * * * *

UNITED STATES PATENT AND TRADEMARK OFFICE
CERTIFICATE OF CORRECTION

PATENT NO. : 4,048,267

DATED : Sept. 13, 1977

INVENTOR(S) : James Donald Walker and Leslie F. Kline

It is certified that error appears in the above-identified patent and that said Letters Patent are hereby corrected as shown below:

Title page, last line, "10 Drawing Figures" should be --11 Drawing Figures-- .
Column 1, line 59, "downcomers" should be --downcomer-- .
Column 4, line 64, "collr" should be --collar-- .
Column 8, line 44, "include" should be --including-- .
Column 10, line 30, "mean" should be --means-- .
Column 10, line 52, "claim 4" should be --claim 7-- .

Signed and Sealed this

Twenty-first Day of March 1978

[SEAL]

Attest:

RUTH C. MASON
Attesting Officer

LUTRELLE F. PARKER
Acting Commissioner of Patents and Trademarks